(12) United States Patent
Chung et al.

(10) Patent No.: US 11,657,055 B2
(45) Date of Patent: May 23, 2023

(54) DEVICE AND METHOD FOR PROGRESSIVE TOP-K SUBARRAY QUERY PROCESSING IN ARRAY DATABASES

(71) Applicant: Korea University Research and Business Foundation, Seoul (KR)

(72) Inventors: Yon Dohn Chung, Seoul (KR); Dalsu Choi, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 17/144,363

(22) Filed: Jan. 8, 2021

(65) Prior Publication Data

US 2021/0209111 A1 Jul. 8, 2021
US 2021/0209111 A1 Jul. 8, 2021

(30) Foreign Application Priority Data

Jan. 8, 2020 (KR) .................. 10-2020-0002672

(51) Int. Cl.
*G06F 16/2455* (2019.01)
*G06F 16/2457* (2019.01)
*G06F 16/22* (2019.01)

(52) U.S. Cl.
CPC .... *G06F 16/24554* (2019.01); *G06F 16/2237* (2019.01); *G06F 16/24573* (2019.01)

(58) Field of Classification Search
CPC .......... G06F 16/24554; G06F 16/2237; G06F 16/24573
See application file for complete search history.

(56) References Cited

U.S. PATENT DOCUMENTS

| | | | |
|---|---|---|---|
| 6,760,724 B1* | 7/2004 | Chakrabarti | G06F 16/283 707/999.102 |
| 9,761,204 B1* | 9/2017 | Ginetti | G06T 1/20 |
| 10,108,509 B2* | 10/2018 | Qidwai | G11C 11/2277 |
| 2012/0323867 A1* | 12/2012 | He | G06F 16/2453 707/693 |
| 2015/0319230 A1* | 11/2015 | Skjolsvold | H04L 67/101 709/224 |
| 2017/0060944 A1* | 3/2017 | Khayyat | G06F 16/2237 |

(Continued)

FOREIGN PATENT DOCUMENTS

| | | |
|---|---|---|
| JP | 2015-232782 A | 12/2015 |
| KR | 10-2017-0076541 A | 7/2017 |
| KR | 10-2017-0128666 A | 11/2017 |

OTHER PUBLICATIONS

"Progressive Top-k Subarray Query Processing in Array Databases", May 2019, URL=https://dl.acm.org/doi/10.14778/3329772.3329776, download date Feb. 26, 2022, p. 13 (Year: 2019) (Year: 2019).*

(Continued)

*Primary Examiner* — Vaishali Shah
(74) *Attorney, Agent, or Firm* — NSIP Law

(57) ABSTRACT

A method of processing top-k (k is a natural number) query in array data is described. The method of processing the top-k query is performed in a computing device including at least a processor, and includes dividing an array including a plurality of cells into a plurality of partitions, and finding an $i^{th}$ answer in the array.

7 Claims, 10 Drawing Sheets

(56) References Cited

U.S. PATENT DOCUMENTS

2019/0075727 A1* 3/2019 Duke .................. G06V 20/17
2020/0333662 A1* 10/2020 Hu ..................... G09G 3/2077

OTHER PUBLICATIONS

Heo, Jun-Seok., "Abstracted Partitioned-Layer Index: A Top-k Query Processing Method Reducing the No. of Random Accesses of the Partitioned-Layer Index", *Journal of Korea Multimedia Society*, Sep. 2010, (pp. 1299-1313).

Choi, Dalsu et al., "Progressive Top-k Subarray Query Processing in Array Databases." *Proceedings of the VLDB Endowment*, 12, 9, 2019 (pp. 989-1001).

* cited by examiner

Algorithm 1: PPTS for a disjoint query

Input : $k$, subarray size $SS$, scoring function $SF$, selection conditions $SC$, sorted partitions $P$ on an array $A$
Output: disjoint top-$k$ subarrays 1   $currentTop \leftarrow (null, -\infty)$;
     // a set of top-$k$ subarrays selected thus far
2   $TopK \leftarrow \emptyset$;
3   priority queue $Candidates \leftarrow \emptyset$;
4   for $i=1$ to $k$ do
5      foreach *unchecked partition* $p \in P$ do
         // Answer-returning condition
6         if $currentTop.score > UBS(p)$ then
7           | break;
8         end
         // Compute the scores of all unchecked subarrays overlapping with $p$
9         $getScores(p, currentTop, TopK)$;
10      end
11      if $currentTop=(null,-\infty)$ then
12        | quit;
13      end
14      output $currentTop$ as the $i^{th}$ answer;
15      $TopK \leftarrow TopK \cup \{currentTop.SA\}$;
16      From $Candidates$, remove subarrays that overlap with at least one subarray in $TopK$;
17      if $Candidates = \emptyset$ then
18        | $currentTop \leftarrow (null, -\infty)$;
19      else
20        | $currentTop \leftarrow Candidates.pop()$;
21      end
22 end 23 Procedure $getScores(p, currentTop, TopK)$:
24     $overlappingSA \leftarrow$ a set of unchecked subarrays of size $SS$ and overlapping with partition $p$;
25     foreach $SA \in overlappingSA$ do
26        if *SA satisfies SC* then
27          $score \leftarrow SF(SA)$;
28          if $score > currentTop.score$ then
29            if *SA is disjoint from all subarrays in TopK* then
30              $currentTop \leftarrow (SA, score)$;
31              $Candidates \leftarrow Candidates \cup \{currentTop\}$;
32            end
33          else
34            | $Candidates \leftarrow Candidates \cup \{(SA, score)\}$;
35          end
36        end
37     end

Algorithm 2: (Master node)
Distributed processing of PPTS

Input : $k$
Output : disjoint top-$k$ subarrays
1 Let $S$ be a set of $N$ slave nodes;
2 $S' \leftarrow S$;
3 for $i=1$ to $k$ do
4     foreach $slave \in S'$ do
5        Request and receive the local answer in $slave$;
6     end
7     $globalAnswer_i \leftarrow$ the best among all local answers of the nodes in $S$;
8     output $globalAnswer_i$ as the $i^{th}$ answer;
9     if $i < k$ then
10        Send $globalAnswer_i.SA$ to all slave nodes in $S$;
11        $S' \leftarrow$ a set of slave nodes in $S$, the current local answers of which overlap with $globalAnswer_i.SA$;
12     end
13 end
14 Notify all the slave nodes in $S$ of termination;

Algorithm 3: (Slave node)
Distributed processing of PPTS

Input: chunks, $k$, subarray size $SS$, scoring function $SF$, selection conditions $SC$, sorted partitions on each chunk 1  $localAnswer \leftarrow (null, -\infty)$;
2  $globalAnswers \leftarrow \emptyset$;
3  priority queue $Candidates \leftarrow \emptyset$;
4  Determine the sizes of chunk overlaps based on $SS$, and transfer cells among nodes to form the chunk overlaps if chunks do not have enough overlaps;
5  while *True* do
6    Wait until a message $m$ from the master node arrives;
7    switch $m$ do
8      case $m$ *requests the subsequent local answer* do
9        if $Candidates \neq \emptyset$ then
10         $localAnswer \leftarrow Candidates$.pop();
11       end
12       Sort the chunks in the node in descending order of $UBS(nextPartition)$;
13       foreach *chunk c in the current node* do
14         if $localAnswer.score > UBS(c.nextPartition)$ then
15           continue;
16         end
17         Read chunk $c$;
18         for $p = c.nextPartition$ to $c.lastPartition$ do
19           if $localAnswer.score > UBS(p)$ then
20             break;
21           end
22           $getScores(p, localAnswer, globalAnswers)$;
23         end
24       end
25       Send $localAnswer$ to the master node;
26     end
27     case $m$ *delivers* $globalAnswer_i.SA$ do
28       $globalAnswers \leftarrow globalAnswers \cup \{globalAnswer_i.SA\}$;
29       Remove subarrays from $Candidates$ that overlap with at least one subarray in $globalAnswers$;
30     end
31     case $m$ *notifies termination* do
32       quit;
33     end
34   end
35 end

Algorithm 4: Maximal density estimation

---
Settings: $N$ slave nodes
Input : partitions, subarray size $|Ds_1| \times ... \times |Ds_m|$,
partition size $\{l_1, ..., l_m\}$
Output : maximal density estimates for each chunk 1  $start \leftarrow \{0, ...\}$, $end \leftarrow \{0, ...\}$;
2  $newSubarray \leftarrow \{0, ...\}$, $newOverlap \leftarrow \{0, ...\}$;
3  for $i=1$ to $m$ do
4      $start[i] \leftarrow start[i] + l_i - 1$;
5      $end[i] \leftarrow start[i] + |Ds_i| - 1$;
6      $newSubarray[i] \leftarrow \lfloor end[i]/l_i \rfloor - \lfloor start[i]/l_i \rfloor + 1$;
7      $newOverlap[i] \leftarrow \lceil (|Ds_i| - 1)/l_i \rceil$;
8  end
9  Transfer the cell counts of partitions among nodes to attain the $newOverlap$-sized overlaps for each chunk;
   // Now, each node independently executes the algorithm below
10 foreach $C_i \in$ *chunks in the current node* do
11     $maxCount \leftarrow$ Top-1 $newSubarray$-sized subarray when the scoring function is $sum$;
12     $maxDensity \leftarrow min(maxCount/(|Ds_1| \times ... \times |Ds_m|), 1)$;
13     Write $(i, maxDensity)$ to the current node;
14 end

DEVICE AND METHOD FOR PROGRESSIVE TOP-K SUBARRAY QUERY PROCESSING IN ARRAY DATABASES

CROSS-REFERENCE TO RELATED APPLICATIONS

This application claims priority under 35 U.S.C. § 119 to Korean Patent Application No. 10-2020-0002672 filed on Jan. 8, 2020, in the Korean Intellectual Property Office, the disclosures of which are incorporated by reference herein in their entireties.

BACKGROUND

Embodiments of the present disclosure described herein relate to a method of processing query for a database, and more particularly, relate to a method of processing query, which efficiently and progressively finds top-k subarrays in an array database.

Currently, unprecedented amounts of multidimensional array data are being generated in various fields. Due to the need for efficient management of multidimensional array data, various array management systems based on an array data model have been proposed.

A top-k query outputs the k records with the highest scores. These top-k records may represent the most important answers among all possible answers in a specific aspect. Therefore, users may more easily understand the data through this. Also, top-k queries may be used to obtain basic knowledge before application of complex data analysis techniques.

Array databases manage extremely large multidimensional array data, and therefore, it is not easy to understand data intuitively or to extract important regions. For efficiently analyzing and understanding large array data, the support of top-k queries in array databases is required. The concept of top-k queries may be easily applied to multidimensional array databases as follows.

Example 1: Meteorologists monitor global cloudiness and its associated characteristics. Cloudiness monitoring plays an important role in predicting climate changes, because clouds affect the global energy balance. Frequently, the meteorologists objective is to find k fixed-sized regions sorted by a scoring function. FIG. 1 illustrates an map. In FIG. 1, two-dimensional arrays with top-2 subarrays are shown. In FIG. 1, shaded regions represent top-2 regions according to a given scoring function and selection conditions. The meteorologists may extract interesting and important regions, study the changes in k regions in time-series, and find unexpected changes.

Example 2: Researchers plans to create an Amazon deforestation detection system. The Amazon has a profound effect on ecological conditions worldwide. Therefore, monitoring deforestation in the Amazon is critical. The researchers extract top-k fixed-sized regions as scored by the average of the Normalized Difference Vegetation Index (NDVI). The researchers also attempt to extract the top-k regions (where the regions are scored depending on the average of the difference between neighboring arrays in the NDVI).

In the above example, the top-k results are an ordered sequence not of k cells, but k subarrays. This novel type of query for a multidimensional array databases will be referred to as a top-k subarray query herein. The upper subarray query is useful for understanding the array data and finding the meaning of the array data.

Until now, there is no efficient method for solving such a top-k subarray query. In a naive manner, the scores of all subarrays in a given array may be computed and k subarrays with the highest score may be selected. However, the naive method suffers two problems. First, the computation of the scores of all subarrays in a large array is very time consuming. Second, until computing the scores of all the subarrays, users cannot know the answers, so usability is severely decreased.

In the present disclosure, an efficient processing method for top-k subarray queries for array databases based on the following research directions is proposed. First, the top-k subarrays should be founded without necessarily calculating all subarrays in the given array. Second, usability should be improved. Third, it is necessary to prevent memory overflow during the query processing in large array data. Fourth, distributed processing should be supported, because most array database systems basically support distributed environments due to the very large amount of array data that they managed.

First, the top-k subarray queries in the array database are defined. Different subarrays may or may not overlap one another. Thus, two different types of top-k subarray queries may be defined: an overlap-allowing top-k subarray query and a disjoint(non-overlap) top-k subarray query. The overlap-allowing top-k subarray query reflects the objective to find the subarrays with the highest scores, regardless of overlaps. In some cases, most of the k subarrays may overlap one another when a small region has extremely large attribute values. In this case, the result may be less meaningful, because the subarrays are located at almost the same position. Therefore, it is necessary to define an additional top-k subarray query, that is, the disjoint (separate or non-overlap) top-k subarray query. The disjoint top-k subarray query returns top-k subarrays disjointed (separated or non-overlapped) from one another.

For solving these two types of top-k subarray queries, preprocess may be performed on the array data. First, the array is partitioned to allow useful summary information to be extracted. In the present disclosure, a method of processing a top-k subarray query called PPTS is proposed. The proposed method utilizes these partitions and prunes search space to find top-k subarrays efficiently. A query is solved progressively. The progressive approach increases usability, because the user is capable of performing data analysis using the partially returned subarrays while the query finds the remaining answers. Then, the present disclosure proposes a distributed progressive top-k subarray query processing method. The Support of distributed processing is a critical issue in large scale data analysis. Finally, optimization techniques for the proposed methods are introduced.

SUMMARY

Embodiments of the present disclosure provide a device and method of processing progressive top-k query in an array database.

According to an embodiment, a method of processing top-k query in array data is performed in a computing device including at least a processor and includes dividing an array including a plurality of cells into a plurality of partitions and finding an $i^{th}$($1 \leq i \leq k$) answer in the array.

BRIEF DESCRIPTION OF THE FIGURES

The above and other objects and features of the present disclosure will become apparent by describing in detail embodiments thereof with reference to the accompanying drawings.

FIG. 4 illustrates Algorithm 1;

FIG. 9 illustrates Algorithm 2;

FIG. 10 illustrates Algorithm 3;

FIG. 11 illustrates Algorithm 4; and

DETAILED DESCRIPTION

Figure 1:
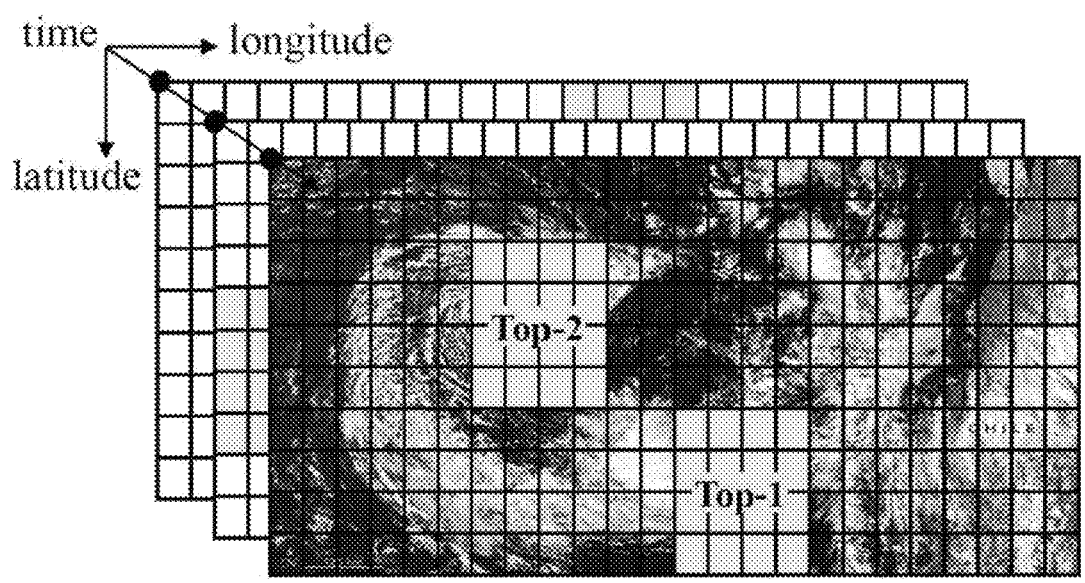
FIG. 1 illustrates an exemplary map.

Disclosed hereinafter are exemplary embodiments of the present invention. Particular structural or functional descriptions provided for the embodiments hereafter are intended merely to describe embodiments according to the concept of the present invention. The embodiments are not limited as to a particular embodiment.

Terms such as "first" and "second" may be used to describe various parts or elements, but the parts or elements should not be limited by the terms. The terms may be used to distinguish one element from another element. For instance, a first element may be designated as a second element, and vice versa, while not departing from the extent of rights according to the concepts of the present invention.

Unless otherwise clearly stated, when one element is described, for example, as being "connected" or "coupled" to another element, the elements should be construed as being directly or indirectly linked (i.e., there may be an intermediate element between the elements). Similar interpretation should apply to such relational terms as "between", "neighboring," and "adjacent to."

Terms used herein are used to describe a particular exemplary embodiment and should not be intended to limit the present invention. Unless otherwise clearly stated, a singular term denotes and includes a plurality. Terms such as "including" and "having" also should not limit the present invention to the features, numbers, steps, operations, sub-parts and elements, and combinations thereof, as described; others may exist, be added or modified. Existence and addition as to one or more of features, numbers, steps, etc. should not be precluded.

Unless otherwise clearly stated, all of the terms used herein, including scientific or technical terms, have meanings which are ordinarily understood by a person skilled in the art. Terms, which are found and defined in an ordinary dictionary, should be interpreted in accordance with their usage in the art. Unless otherwise clearly defined herein, the terms are not interpreted in an ideal or overly formal manner.

Hereinafter, exemplary embodiments of the present disclosure will be described in detail with reference to the accompanying drawings. However, the scope of the patent application is not confined or limited by these embodiments. The same reference numerals in each drawing indicate the same members.

First, terms used in the present specification are defined.

Definition 1.1 (Array).

Suppose that a dimension $D_i$ is a set of consecutive integers in $[L_i, U_i]$, i.e., $D_i = \{x \in Z | L_i \leq x \leq U_i\}$, where lower bound $L_i$ and upper bound $U_i$ are integers, and an attribute $A_i$ is a set of real numbers. Given m dimensions $\{D_1, D_2, \ldots, D_m\}$ and n attributes $\{A_1, A_2, \ldots, A_n\}$, an m dimensional array A is defined by a function $D_1 \times D_2 \times \ldots \times D_m \rightarrow (A_1, A_2, \ldots, A_n)$. A tuple $(d_1, d_2, \ldots, d_m)$ in $D_1 \times D_2 \times \ldots \times D_m$ is called of the array.

Definition 1.2 (Subarray).

Given an array A defined by $D_1 \times D_2 \times \ldots \times D_m \rightarrow (A_1, A_2, \ldots, A_n)$, a subarray SA of A is an array $Ds_1 \times Ds_2 \times \ldots \times Ds_m \rightarrow (A_1, A_2, \ldots, A_n)$, where $D_i = \{x \in Z | L_i \leq x \leq U_i\}$ ($1 \leq i \leq m$), $\{x \in Z | Ls_i \leq Us_i \leq U_i\}$ ($1 \leq i \leq m$), and the attribute values of a cell $(d_1, d_2, \ldots d_m)$ in SA are the same as those in A. $(Ls_1, Ls_2, \ldots, Ls_m)$ is the starting cell of a subarray and $(Us_1, Us_2, \ldots, Us_m)$ is the ending cell. A subarray is denoted by SA(starting cell, $|Ds_1| \times |Ds_2| \times \ldots \times |Ds_m|$).

For ranking subarrays and find the top-k ones, a scoring function SF is applied to a subarray, which aggregates the values of a selected attribute, called a measure attribute, in the cells of the subarray and produces a score value. In the present disclosure, assume that a scoring function strictly increases with regard to a partial order on the sets of attribute values, i.e., given two sets of attribute values, $\{c_{11}, c_{12}, \ldots, c_{1k}\}$ and $\{c_{21}, c_{22}, \ldots, c_{2k}\}$, when $c_{1i} < c_{2i}$ for $\forall i \in \{1, 2, 3, \ldots k\}$, $SF(\{c_{11}, c_{12}, \ldots, c_{1k}\}) < SF(\{c_{21}, c_{22}, \ldots, c_{2k}\})$. Example scoring functions are Sum (a function calculating the sum), Avg (a function calculating the average), Min (a function calculating the minimum value), Max (a function calculating the maximum value), and Median (a function calculating the median value).

Definition 1.3 (Top-k Subarray Query).

Given an array A, a scoring function SF, selection conditions SC, a subarray size $|Ds_1| \times |Ds_2| \times \ldots \times |Ds_m|$, and an integer k, a top-k subarray query finds the number of $|Ds_1| \times |Ds_2| \times \ldots \times |Ds_m|$-sized subarrays of A that have highest scores obtained from the SF and satisfy SC.

The top-k subarrays may be disjoint (non-overlap) or not (overlapped). Therefore, two types of top-k subarray queries: (1) the overlap-allowing top-k subarray query and (2) the disjoint top-k subarray query. The overlap-allowing top-k subarray query finds subarrays that satisfy Definition 1.3, regardless of overlaps among the resultant subarrays. That is, k subarrays may or may not overlap one another. Accordingly, an overlap-allowing top-k subarray query may ultimately include less meaningful k subarrays. That is, it is possible that most subarrays overlap one another when a small region in the given array contains many cells with extremely large values of the measure attribute. Thus, disjoint top-k subarray queries is needed separately.

Definition 1.4 (Disjoint Top-k Subarray Query).

Given an array A, a scoring function SF, selection conditions SC, a subarray size $|Ds_1| \times |Ds_2| \times \ldots \times |Ds_m|$, and an integer k, a disjoint top-k subarray query finds the k number of $|Ds_1| \times |Ds_2| \times \ldots \times |Ds_m|$-sized subarrays of A, $\{SA_1, SA_2, \ldots, SA_k\}$, that satisfy SC and the following conditions.

$SA_1$ is the subarray having the highest score.

$SA_i (2 \leq i \leq k)$ is the subarray that is disjoint from all $SA_j$ ($1 \leq j < i$) (i.e. does not overlap with all $SA_j (1 \leq j < i)$ and has the highest score.

In the present specification, overlap-allowing top-k subarray queries are referred to as overlap-allowing queries and disjoint top-k subarray queries are referred to as disjoint queries.

Usually, a considerable amount of query processing time is required to find the top-k subarrays in a huge volume of multidimensional array data. For reducing the response time and increase the usability, the present disclosure proposes a progressive method for top-k subarray query processing, called PPTS.

First, a naive method used to evaluate top-k subarray queries on array databases is described. This method computes all possible subarrays' scores and selects the top-k results, and therefore, is not progressive. The present disclosure for overlap-allowing queries computes all the subarrays that satisfy the selection conditions with the given subarray size in the given array and stores only the k subarrays that have the highest scores during query processing. When a new subarray with a score higher than that of the $k^{th}$ subarray in the candidate subarrays is found, it becomes a new candidate for the top-k answers, replacing the previous $k^{th}$ one. The method allows overlaps among the top-k subarrays.

On the basis of the above-described overlap-allowing query processing method, a naive method for disjoint queries is introduced. In disjoint queries, selected subarrays should be disjoint from one another. The method also computes all the subarray's scores in the given array. However, the difference between overlap-allowing and disjoint queries is that disjoint queries cannot determine whether a subarray is one of the top-k subarrays while computing subarrays, which means all the computed subarrays should be maintained. A more detailed description of this will be described later. After checking all the subarrays, the method sorts them by scores and finds the disjoint top-k subarrays that satisfy Definition 1.4.

Hereinafter, a PPTS scheme proposed by the present disclosure will be described.

The present disclosure proposes a partition-based progressive top-k subarray query processing method (PPTS).

Figure 2:
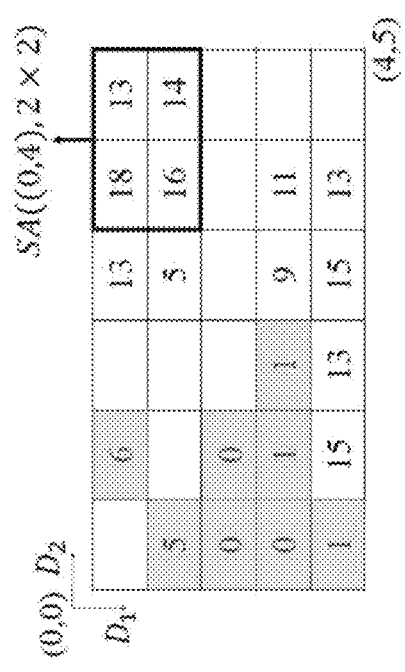
FIG. 2 illustrates an example of a two-dimensional array with a single attribute and a top-k subarray query.

Irrespective of the query type, The naive technique described above compute all possible subarrays in the array, which incurs an expensive computational cost. Referring to FIG. 2 as an example, although it is unlikely that the subarrays including shaded cells belong to the top-k answers, they should be also computed. Furthermore, the above-described method cannot return the top-k subarrays progressively. For overcoming these problems, the present disclosure proposes a new top-k subarray query processing method. The proposed method includes two steps: partitioning the array and processing the top-k subarray queries using partitions.

Preprocessing-Partitioning Over Array Data

For allowing efficient processing of top-k subarray queries, partitioning the given array data and computing useful information about the partitions are proposed. The insight that suggested partitioning is that neighboring cells in array data tend to have similar attribute values. The partitioning results are used to prune the search space for finding top-k subarrays. Given a set of partitioning sizes $\{l_1, l_2, \ldots, l_m\}$ for the dimensions of an m dimensional array data, the entire array is divided into uniform subarrays called partitions. Then, each partition is shrunk as much as it may be while still containing all the cells (with attribute values) in the partition.

Figure 3:
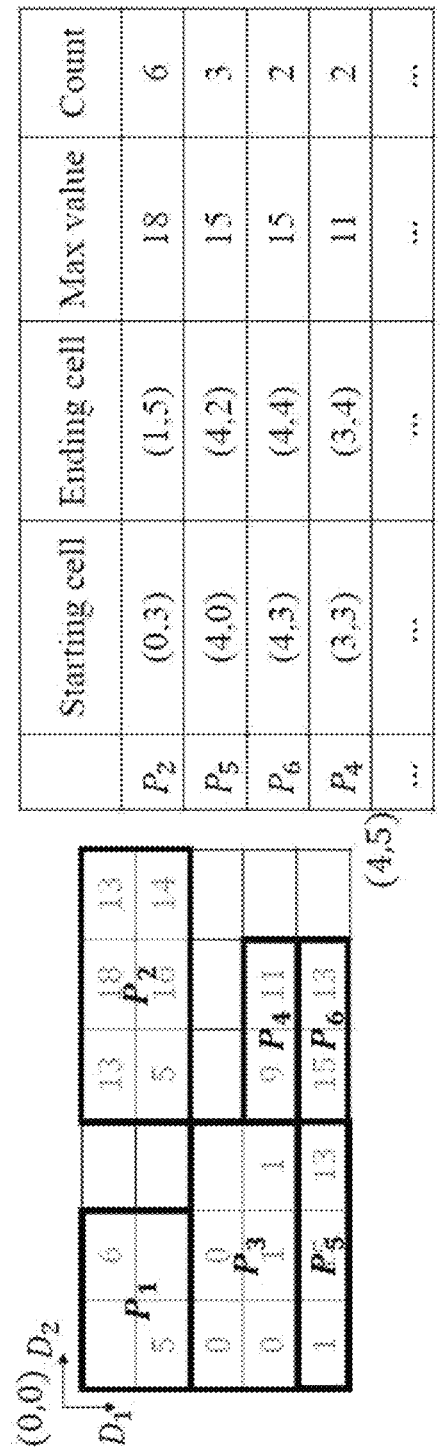
FIG. 3 illustrates an example of partitions.

A partitioning algorithm is as follows. First, the given array is partitioned uniformly with partition size parameters $\{l_1, l_2, \ldots, l_m\}$ the partitions are shrunk, and their maximum values (i.e., the largest measured attribute value in the partition) and cell counts of the measure attribute are calculated. Second, the partitions are sorted in descending order of maximum values. Finally, information about the partitions, including starting cells (e.g., the location information of the upper left cell of the partition), ending cells (e.g., the location information of the lower right cell of the partition), maximum values, and cell counts, are stored on disk in a partition table. FIG. 3 shows the results of partitioning with partition size parameters $\{2, 3\}$ in the given example array, that is, $l_1$ is 2 and $l_2$ is. Given the partition size parameters, an initial partition may be composed of a 2×3 matrix or a 2×3 cell set. That is, the partition size parameters prescribe the row size and column size of cells included in the initial partition.

The time complexity of partition computation is O(n+NlogN), where n is the number of cells in the given array, and N is the number of partitions produced, since it is necessary to scan the entire array data and sort the resulting partitions. When the measure attribute is changed to the other attribute, partitioning should be performed for the new measure attribute.

Hereinafter, a basic partition-based progressive top-k subarray query processing method will be described.

First, MVS (maximal virtual subarray) and UBS (upper bound score) will be described.

Definition 2.1 (MVS, Maximal Virtual Subarray).

Given a partition $p_i$ and a subarray's size $|Ds_1| \times \ldots \times |Ds_m|$, the maximal virtual subarray of $p_i$ is a $|Ds_1| \times \ldots \times |Ds_m|$-sized subarray where all the cells have the maximum value of the measure attribute in $p_i$.

Definition 2.2 (USB, Upper Bound Score).

Given a partition $p_i$ and a scoring function SF, the upper bound score of $p_i$ is $SF(MVS(p_i))$.

Lemma 2.1.

Suppose that there are a scoring function SF and a sequence of partitions $P=\{p_1, p_2, \ldots, p_n\}$ on an array in descending order of their maximum values. When a subarray SA overlaps with $p_i(1 \le i \le n)$ but does not overlap with any partitions in $P'=\{p_1, p_2, \ldots, p_{i-1}\}$, $SF(SA) \le UBS(p_i)$.

PROOF. When i=1, $MVS(p_1)$ consists of the maximum value in the entire array, and thus, $SF(SA) \le UBS(p_1)$. For $i(1<i \le n)$, assume that $SF(SA)>UBS(p_i)$. There exists at least one cell C in SA that has a value larger than $p_i$'s maximum value m. Since all the cell values in $p_i$ are smaller than or equal to m, c does not belong to $p_i$. Then, c should belong to another partition p', the maximum value of which is obviously larger than or equal to the value of c. This means that p' belongs to P' and SA overlaps with a partition in P', which is a contradiction of the assumption.

Corollary 2.1. Given a scoring function SF and a set of partitions P on an array, when a subarray SA overlaps with a subset of partitions $P_s \subseteq P$ and the partition $p_m \in P_s$ has the highest maximum value among partitions in $P_s$, then $SF(SA) \le UBS(p_m)$.

PROOF. SA overlaps with $p_m$ but does not overlap with any partition which has a higher maximum value than $p_m$. Therefore, $SF(SA) \le UBS(p_m)$ by Lemma 2.1.

If selection conditions SC is considered when getting UBS, UBS could be lowered; however, it is impossible for UBS to grow larger, which means that UBS still works.

Based on the previous definitions and lemma, the top-k subarrays may safely be returned progressively without checking all the subarrays in the given array. Partition-based progressive disjoint top-k subarray query processing in Algorithm 1 (refer to FIG. 4) is described. For finding the $i^{th}$ answer $(1 \le i \le k)$ in the given array, the algorithm selects partitions serially in the sorted order and calculates the scores of all the unchecked subarrays related to each partition. The partitions are sorted in descending order of their max values. Thus, the algorithm searches the partitions that have higher maximum values earlier, which means that subarrays with higher scores are considered first. currentTop in Algorithm 1 keeps a subarray with its score that is the most promising candidate of the $i^{th}$ answer. The algorithm checks the first unchecked partition in P and calls the procedure getScores on the partition. For each subarray in the set overlappingSA unchecked subarrays overlapping with the partition, when it satisfies the selection conditions, the algorithm calculates the score (Lines 26-27). For finding overlappingSA, the algorithm utilizes a Boolean array to determine whether each subarray has been already checked (Line 24). When the subarray's score is smaller than or equal to that of currentTop, the algorithm inserts the subarray into Candidates (Line 34); otherwise, when it is disjoint from all subarrays in TopK, currentTop and Candidates are updated with the subarray (Lines 28-32). Candidates is used to keep a set of subarrays that may be an answer to the query following the $i^{th}$ answer.

After processing the partition, the algorithm goes to the next partition and checks the answer-returning condition (Lines 6-8). When currentTop's score is higher than the partition's upper bound score, currentTop may safely be returned as the $i^{th}$ answer (Line 14). Because the partitions are checked in descending order of maximum values, the UBS of a partition is the possible maximal score that an unchecked subarray overlapping with the partition may have. Therefore, when currentTop satisfies the answer-returning condition, there exist no unchecked subarrays in the remaining partitions that have higher scores than currentTop. currentTop should be inserted into TopK and is used to filter candidate subarrays that overlap with the existing answers (Line 15). After returning the $i^{th}$ answer, the algorithm removes unnecessary subarrays from Candidates and selects the subarray with the highest score in Candidates as new currentTop (Lines 16-21). Namely, the subarrays overlapping with the $i^{th}$ answer in Candidates may be deleted.

Although the overlap-allowing query processing algorithm is similar to Algorithm 1 for disjoint queries, there are two major differences. First, after returning the $i^{th}$ answer, it does not consider overlaps and selects the subarray with the highest score in Candidates as a new currentTop. Second, after calculating a subarray's score (Line 27), an overlap-allowing query does not consider the disjoint condition. When a subarray satisfies the selection conditions, it is inserted into Candidates. When the score of subarray is higher than that of currentTop, it becomes new currentTop, without the overlaps being considered. Selection conditions herein may be detailed conditions for attributes, cells, or arrangements, and specially predetermined selection conditions may not exist.

Figure 5:
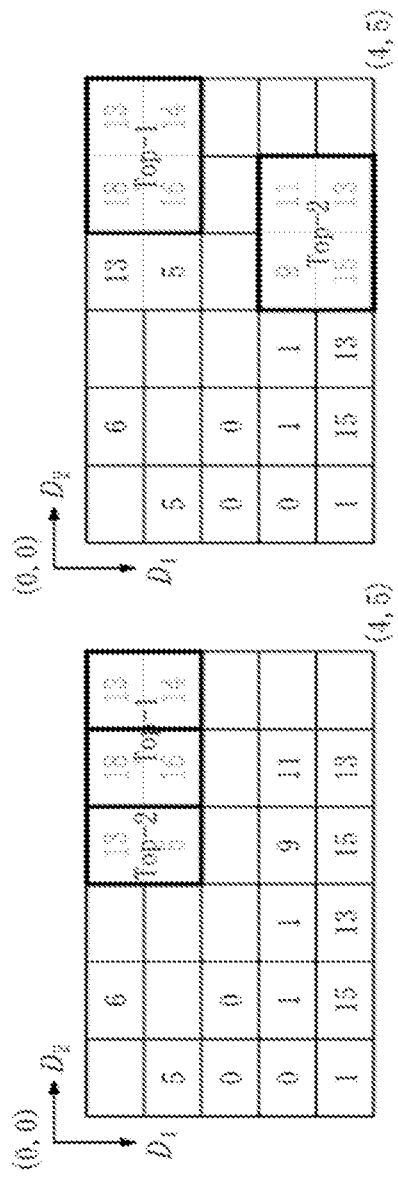
FIG. 5 illustrates answers to top-2 subarray queries using arrays, queries, and partitions of FIGS. 2 and 3.

An exemplary arrangement and query based on PPTS is shown in FIG. 2 and partitions are shown in FIG. 3. In addition, FIG. 5 illustrates answers to top-2 subarray queries using arrays, queries, and partitions of FIGS. 2 and 3.

Assume that the query finds disjoint top-2 subarrays. The query visits the first partition $P_2$, the starting cell of which is (0,3). After all the subarrays overlapping with the partition are computed, currentTop is $\{(0,4),61\}$. The query reads the next partition $P_5$; its UBS is 60, and therefore, currentTop satisfies the answer-returning condition. After the third partition $P_6$ is visited, currentTop becomes $\{(3,3),48\}$. Its score is higher than the UBS of the fourth partition $P_4$, 44. The query returns $\{(3,3),48\}$ as the second answer without calculating the remaining subarrays.

Theorem 2.1 Given a scoring function SF, a sequence of $P=\{p_1, p_2, \ldots, p_n\}$ on an array in descending order of their maximum values, and a top-k subarray query, assume that a set of partitions $P'=\{p_1, p_2, \ldots p_{i-1}\}(1<i\leq n)$ has been processed by the proposed algorithms. Let ANS be a subarray having the highest score among all the checked subarrays that are candidates for the next answer. When the score of ANS is larger than the UBS of the partition $p_i$, i.e., SF(ANS)>UBS($p_i$), there exist no unchecked subarrays having scores larger than ANS's score.

PROOF. Assume that there exists an unchecked subarray SA, the score of which is larger than that of ANS, i.e., SF(SA)>SF(ANS). Since all subarrays overlapping with partitions in P' have already been computed, SA does not overlap with any partition in P', whereas it overlaps with at least one partition in P−P'. Without loss of generality, let $p_j(i\leq j\leq n)$ be a partition in P−P' that overlaps with SA and has the largest maximum value. This means that SA does not overlap with $\{p_1, p_2, \ldots, p_{j-1}\}$, whereas it overlaps with $p_j$. By Lemma 2.1, SS(SA)≤UBS($p_j$) and, by the order of partitions, UBS($p_j$)≤UBS($p_i$). Thus, when there is SF(ANS)>UBS($p_i$), SF(SA)<SF(ANS) holds, which is a contradiction of the assumption.

Distributed Processing

Before proposing distributed processing for top-k subarray query processing, the notion of chunking in array databases is introduced. When an array is too large to be stored in one node, array databases should spread the array across multiple nodes. For this purpose, array databases divide an array into multiple chunks (refer to Non-Patent Documents 6, 7, 20, 22, and 28). Chunking is a basic principle for supporting distributed processing in array databases. A chunk becomes the unit of I/O and network transfer. SciDB (refer to Non-Patent Document 7), the de facto standard array database, divides an array into regular chunks, which means that each chunk has the same dimension sizes. SciDB requires users to input each dimension's size for chunks. ArrayStore (refer to Non-Patent Document 22) provides regular chunking, irregular chunking, and two-level chunking in regular or irregular fashions. Irregular chunking results in each chunk having different dimension sizes; the chunks satisfy different conditions, such as that the number of non-empty cells should be the same. The regular chunking strategy is used herein, but is limited thereto. The proposed methods may be easily extended for application to irregular chunking.

Assume a column store array database, which means they store the values of each attribute as separate chunks.

That is, when an array has n attributes $\{A_1, \ldots, A_n\}$, the attribute values of a cell are stored on separate n chunks, all of which are stored in one node.

Figure 6:
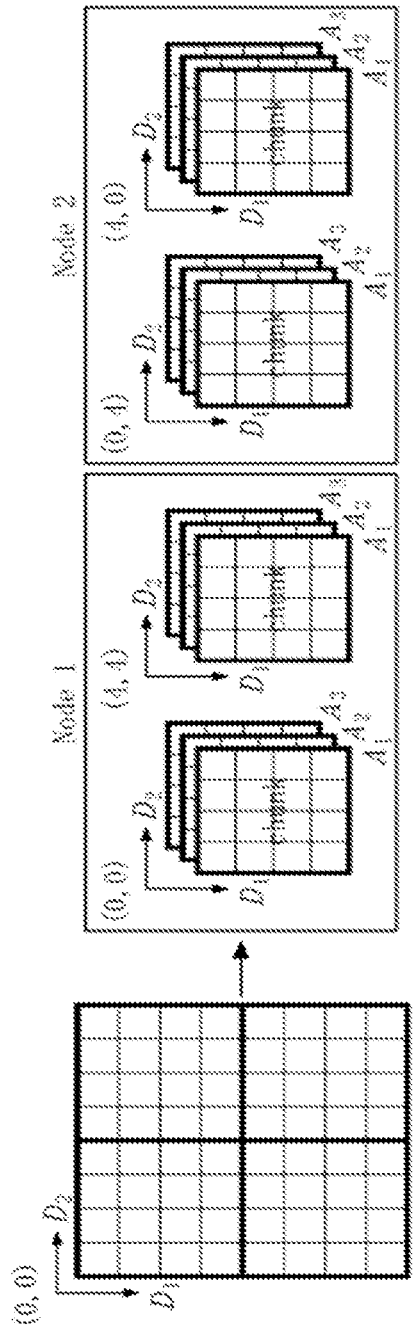
FIG. 6 illustrates regular chunking in an array with two dimensions and three attributes.

FIG. 6 illustrates regular chunking in an array with two dimensions $\{D_1, D_2\}$ and three attributes $\{A_1, A_2, A_3\}$. The chunk sizes for $D_1$ and $D_2$ are 4. The chunks are distributed over two nodes and each node has six chunks.

When the chunks of an array are distributed over multiple nodes, all the boundary subarrays that are on chunk boundaries cannot be calculated within a single node. In FIG. 6, for example, Node 1 cannot calculate the 2×2 subarrays' score starting at (3,3), because it does not have cells at (3,4) and (4,3). To compute boundary subarrays, chunks have additional cells from other chunks according to the given subarray size. Given a subarray size $|Ds_1|\times \ldots \times|Ds_m|$, chunk overlaps of size $|Ds_1|-1$ in each dimension $D_i(1\leq i\leq m)$ to compute all the boundary subarrays is needed.

Definition 3.1 (Chunk Overlap).

Given a set of overlap sizes $X=\{x_1, \ldots x_m\}$, an m dimensional array, the starting cell of which is $\{L_1, \ldots, L_m\}$ and the ending cell $\{U_1, \ldots, U_m\}$, and a chunk, the starting cell of which is $\{Lc_1, \ldots, Lc_m\}$ and the ending cell $\{Uc_1, \ldots, Uc_m\}$, with a set of cells O, the chunk is extended by X with the starting cell $(\max(Lc_1-x_1, L_1), \ldots, \max(Lc_m-x_m, L_m))$ and the ending cell $(\min(Uc_1+x_1, U_1), \ldots, \min(Uc_m+x_m, U_m))$. When the extended chunk has a set of cells E, the chunk overlap means E−O.

Figure 7:
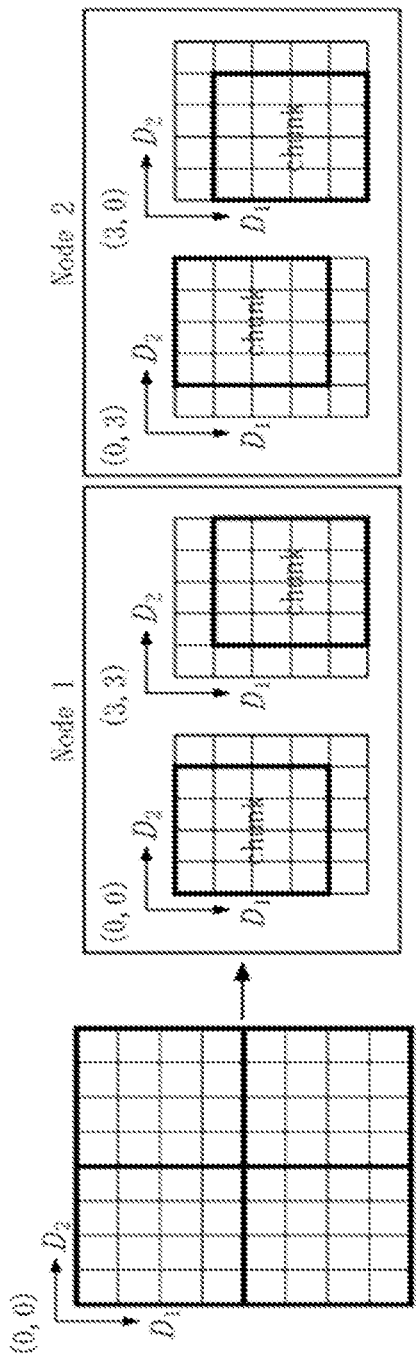
FIG. 7 illustrates the expanded chunks.

When 2×2 subarrays are computed, each chunk needs {1,1}-size overlaps to allow computation of boundary subarrays, as shown in FIG. 7. {1,1}-sized overlaps allow each chunk to compute all boundary subarrays; larger overlaps also do, but are unnecessary. SciDB (refer to Non-Patent Document 7) adopts the chunk overlap mechanism when processing window aggregates. Each chunk cannot know the exact sizes of the overlaps it needs before a top-k subarray query is given at runtime, although the overlaps of each chunk may be pre-defined.

Describes the basic technique of distributed processing.

On the basis of the concepts of chunking and chunk overlaps, a naive method that is capable of being applied in distributed array databases is introduced. For processing an overlap-allowing query, the query determines the sizes of chunk overlaps based on the given subarray size and transfers cells among nodes to attain the chunk overlaps. Then, each node computes the scores of all the subarrays that satisfy the selection conditions, keeping the k subarrays with the highest scores. The k subarrays may be overlapped with one another. Herein, the k subarrays after computing all possible subarrays in each node is called as local top-k subarrays. Each node sends its local top-k subarrays to the master node. The algorithm sorts the subarrays and selects the k subarrays with the highest scores as the global top-k subarrays.

Distributed processing of the naive method for a disjoint query is almost the same as that for an overlap-allowing query. The major difference is that, in a disjoint query each slave node should keep all the computed subarrays in descending order of their scores rather than the local top-k subarrays. The master node receives the subarrays from all the slave nodes until it is capable of deciding global top-k subarrays. That is, the aggregation of the local top-k results from all the slave nodes is not sufficient to allow the master node to determine the global top-k results.

Lemma 3.1.

Given a disjoint top-k subarray query $F(k,A)$ on an array A with a scoring function SF and multiple chunks with chunk overlaps according to the given subarray size over $N(\geq 2)$ nodes, let (1) $A_j$ be a subset of A in Node $j(1 \leq j \leq N)$ such that $A = \cup_{1 \leq j \leq N} A_j$, (2) Top(F(k,A)) be the set of disjoint top-k subarrays from F(k,A) (when there do not exist disjoint k subarrays in A, |Top(F(k,A))| could be smaller than k), and (3) M be the maximum integer in $\{m | 1 \leq j \leq N, m < n', |Top(F(m',A_j))| = m\}$. Then, it does not always hold that $Top(F(k,A)) \subseteq \cup_{1 \leq j \leq N} Top(F(M,A_j))$.

PROOF. Assume that $Top(F(k,A)) \subseteq \cup_{1 \leq j \leq N} Top(F(M,A_j))$ always holds. There may be an example that a subarray $SA_a \in Top(F(M, A_a))$ and a subarray $SA_b \in Top(F(M,A_b))$ ($a \neq b$) overlap each other, and Node a cannot compute $SA_b$. It is obvious that at least one of $SA_a$ and $SA_b$, $SA_{wrong}$ cannot be a member of global top-k subarrays. There could be a real global answer $SA_{real}$ that was not selected as a member of $Top(F(M,A_a))$ or $Top(F(M,A_b))$, because (1) $SF(SA_{real}) < SF(SA_{wrong})$, and (2) $SA_{real}$ overlaps with $SA_{wrong}$. It cannot be guaranteed that this case does not occur, because (1) it cannot be guaranteed that any $SA_a$ and $SA_b$ are always disjoint from each other and (2) when $SA_a$ and $SA_b$ overlap with each other, Node a or b may not know that $SA_b$ or $SA_a$, respectively, exist. Regardless of the size of M, $\cup_{1 \leq j \leq N} Top(F(M,A_j))$ cannot include $SA_{real}$ in this case. The counter-example makes the assumption false, which means that a disjoint top-k subarray query is a holistic problem.

Figure 8:
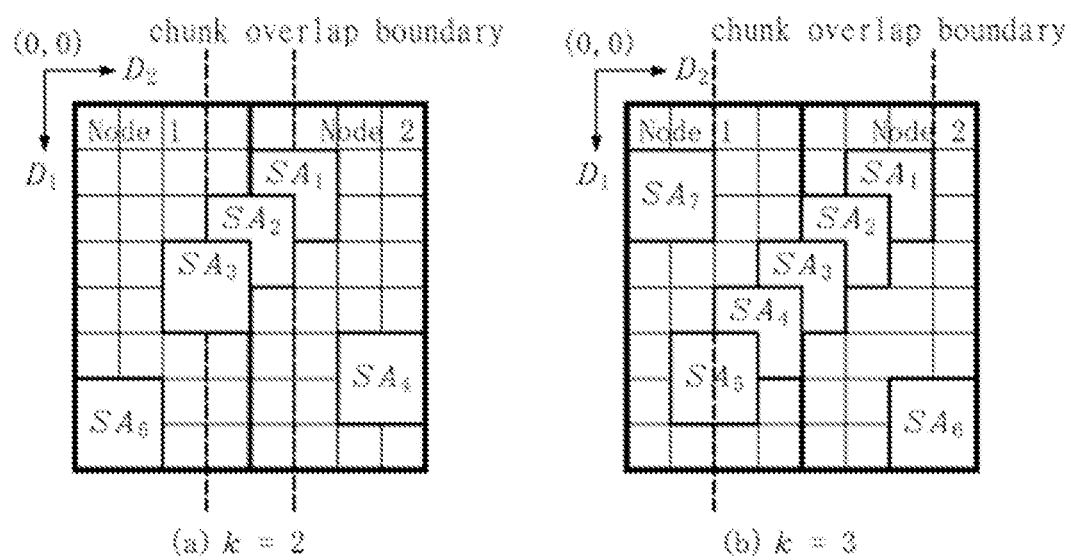
FIG. 8 illustrates an example scenario.

FIG. 8 illustrates example scenarios, where each node contains only one chunk and the subarrays are numbered in descending order of their scores. In FIG. 8A, the sizes of chunk overlaps are {1,1}, because the size of the subarray is 2×2. Disjoint top-2 subarrays, $SA_1$ and $SA_4$, from Node 2 and disjoint top-2 subarrays, $SA_2$ and $SA_5$, from Node 1 do not include one of the real answers, $SA_3$. Although chunks may have larger overlaps, the problem remains, as shown in FIG. 8B, where each node keeps only the top-3 disjoint subarrays. Therefore, the naive method for disjoint top-k queries is not practical when an array is so large that nodes cannot keep all the computed subarrays in the main memory.

Hereinafter, a method of processing a partition-based progressive top-k subarray query will be described.

Before top-k subarray queries are processed, the array is partitioned. In distributed array databases, chunks are partitioned independently of one another for the measure attribute. The results are stored in the same node with the chunks to process future top-k subarray queries. Partitioning does not consider chunk overlaps, because the future subarray size cannot be known.

PPTS in distributed environments is introduced in Algorithms 2 and 3. Assume that there are N slave nodes where the chunks of array data are stored. The master node runs Algorithm 2 and each slave node executes Algorithm 3. Partitions for each chunk in a slave node are arranged (or sorted) in descending order of their maximum values.

Given a top-k subarray query, the slave nodes calculate the size of chunk overlaps based on the given subarray size and transfer cells to one another to form the chunk overlaps when chunks do not have enough overlaps. To determine the $i^{th}(1 \leq i \leq k)$ answer, the master node requests new local answers from the slave nodes in S', which initially includes all slave nodes. Each slave node that receives the request processes its own chunks in descending order of the UBS of the next unchecked partitions in the chunks. This allows each node to visit chunks having partitions with higher UBS values first, which means that the probability that it will find a local answer with a higher score earlier is greater. When the current local answer's score is higher than a chunk's UBS (Line 14, Algorithm 3), the algorithm does not need to explore the chunk and thus it may avoid unnecessary chunk I/O. When this condition is not satisfied, but the chunk satisfies Line 19 (Algorithm 3) after checking one or more partitions, the query may proceed to the next chunk. When checking a partition, all the unchecked subarrays overlapping with the partition of the current chunk, including boundary subarrays, are computed using the procedure defined in Algorithm 1 (Line 22, Algorithm 3). When the current local answer satisfies Line 14 or 19 of Algorithm 3 for all chunks in the slave node, it is determined as the local answer of the slave node and sent to the master node (Line 25, Algorithm 3). When the master node has received local answers from all the slave nodes in S' (Lines 4-6, Algorithm 2), it selects the best one i.e., that with the highest score among the local answers of all slave nodes in S. After returning it as the global $i^{th}$ answer, the master node sends the global answer to all the slave nodes in S (Lines 7-10, Algorithm 2). Each slave node receives the global answer (Line 27, Algorithm 3). When the global answer is not sent to all slave nodes right after it is decided as the $i^{th}$ answer, slave nodes may select wrong local answers overlapping with the global answer when deciding the subsequent global answers. The master node identifies a set S' of the slave nodes, the current local answers of which overlap with the global answer (Line 11, Algorithm 2) and requests the subsequent local answers from the slave nodes in S'.

All slave nodes share the global answers immediately after they are determined by the master node, and therefore, the problem in the distributed version of the naive method for disjoint queries may be avoided. In FIG. 8A, Node 1 selects SA2 as the local answer, and Node 2 performs SA1 using Algorithm 3. The master node receives Nodes 1 and 2's local answers and determines that SA1 is the global top-ranked answer, because SA1's score is higher than SA2's. The master node notifies Nodes 1 and 2 of the global answer. Node 1 may select SA3 as the subsequent local answer, because SA2 is removed from Candidates. Node 2 selects SA4 as the next local answer. After the local answers are sent/received, SA3 is selected as the subsequent global answer.

When subarrays overlapping with a partition that was made without considering chunk overlaps are computed, boundary subarrays are also computed when they exist. Although partitions do not contain cells in chunk overlaps, PPTS guarantees that the global answers that lie on the boundaries of chunks are checked.

Lemma 3.2. Given a sequence of partitions and a top-k subarray query on an array that has chunks distributed among N(≥2) nodes, assume that there exists a boundary subarray SA which is the $i^{th}$(1≤i≤k) highest answer to the query. SA is selected as the local answer by one of the slave nodes SN that include a chunk overlapping with SA when the proposed progressive algorithm finds the $i^{th}$ answer to the query.

PROOF. Assume that SA is not selected as a local answer by any node in SN. Two cases are possible: (1) SA is not checked by any node, and (2) although SA is checked by some node, it is not selected as the local answer of the node. First, Case (1) means that in Node j∈SN, a partition $P_j$ that has the highest UBS among the partitions overlapping with SA is not processed. By Corollary 2.1, this means that SF(SA)≤UBS($p_j$). When searching the $i^{th}$ answer to the query, Algorithm 3 in Node j finds a local answer localAnswer as a candidate for the global $i^{th}$ answer. As $p_j$ is not processed by Node j, UBS($p_j$)<SF(localAnswer). Therefore, SF(SA)<(localAnswer) is provided. Since the master node running Algorithm 2 selects one of the local answers from all the slave nodes as the global $i^{th}$ answer, it is a contradiction of the assumption that SA is the $i^{th}$ answer to the query. For Case (2), the overlap-allowing query and the disjoint query separately is considered. There exists a subarray SAwrong that has the higher score than SA, satisfies the selection conditions, and is selected as the local answer of a slave node in SN. In the overlap-allowing query, because the subarray with the highest score among local answers is selected as the global answer without considering overlaps, it is a contradiction of the assumption of this lemma. In the disjoint query, the existence of SAwrong means that the node in SN does not have at least one of the previously selected global answers, globalAnswers. After a local answer is selected as one of the global answers by the master node, the answer is shared among all slave nodes immediately. Algorithm 2 and 3 remove candidate subarrays that overlap with globalAnswers before finding the $i^{th}$ answer. Also, the procedure in Algorithm 1 does not allow subarrays overlapping with globalAnswers to be a candidate. It is impossible for SAwrong to be disjoint with globalAnswers, which means that Case (2) cannot be happened. Therefore, SA is safely selected as the local answer of a node in SN.

Some boundary subarrays may be evaluated redundantly by several chunks. However, the case rarely happened in experiments because (1) the number of boundary subarrays was small compared to the total number of subarrays and (2) there were few cases that all of the attribute values in a boundary subarray were large enough for all adjacent chunks to check it.

In the following, an optimization technique will be described.

An optimization technique to calculate the scores of the subarrays overlapping with a partition efficiently may be considered. When the scoring function is distributive or algebraic, such as sum or average, a subarray may be divided into several units by the most minor dimension $Ds_m$ and the scores of consecutive subarrays may be computed. The optimization technique using the example is described in FIG. 2. When checking SA((0,3),2×2), the subarray may be sliced into two units {U1, U2} starting at (0,3) and (0,4). The scores of units are computed and summed to obtain the subarray's score. For computing the score of next subarray SA((0,4),2×2), it is not necessary to recalculate the score of U2. Only the score of the unit U3 starting at (0,5) is needed. By subtracting U1's score and adding U3's score from the first subarray's score, the second subarray's score may be obtained. The incremental computation not to the entire array but to the subarrays overlapping with a partition may be applied.

As mentioned in Section 4.2, the UBS of a partition p is derived from the MVS in which all the cells have the maximum value of the measure attribute in p. However, query processing using the UBS could be highly inefficient in the case of sparse arrays, because the UBS may be considerably higher than the scores of actual subarrays overlapping with the partition. Therefore, an optimization technique applied on the UBS for sparse arrays is devised based on maximal density estimation at query runtime. The optimization may be applied when a scoring function SF satisfies the condition: given a set of attribute values C={c1, c2, . . . , cm}, SF(C\{$c_i$})<SF(C) (1≤i≤n). Given a top-k subarray query with a subarray size SS, it estimates the maximal density of each chunk that an SS-sized subarray may have. At query runtime, the UBS is calculated from the MVS that have the estimated density.

The primary concept of the maximal density estimation is that the preprocessing results, partitions, are utilized. The partitions have the number of non-empty cells, and therefore, the maximum number of cells in a specific subarray may be inferred.

Figure 12:
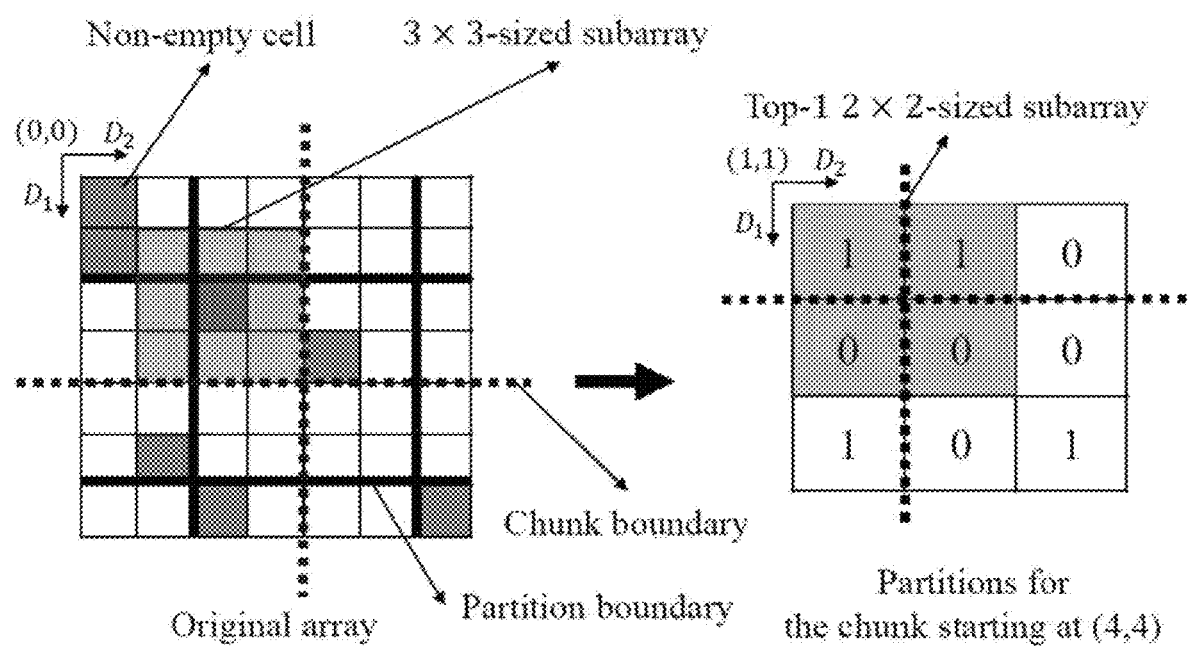
FIG. 12 illustrates an example in which an array is divided into four chunks.

The maximal density estimation algorithm in Algorithm 4 (FIG. 11) will be described. For the sake of simplicity, assume that the dimensions' partition size is submultiples of the corresponding dimensions' chunk sizes. In the algorithm, partitions are temporarily extended to partition boundaries, as shown in FIG. 12. FIG. 12 shows an example where an array is divided into four chunks. The given 3×3-sized subarray may overlap with maximally 2×2 partitions, as shown in the left hand side array in FIG. 12, which means that the new subarray size becomes 2×2 (Line 6). Because the array consists of multiple chunks, the chunk overlaps should be considered. In FIG. 12, it is shown that, to estimate the maximal density of the chunk starting at (4,4), the cell counts of partitions are transferred to obtain {1,1}-sized chunk overlaps (Line 9). Then, the top-1 2×2-sized subarray query on the partitions with the scoring function sum is processed, as shown in the right hand side of FIG. 12 (Line 11). Because partitions of partitions are not considered, all the subarrays' scores are computed. The number of partitions is usually much smaller than that of the cells in the original array, and therefore, it is reasonable that the processing of the top-1 query is based on the naive method. The score of the top-1 answer is 2. Then, the maximal possible density of the original subarray in the chunk of the original array is estimated, which is 9/2 (Line 12). The UBS may be obtained from the MVS where 2/9 cells have the maximum value of a partition and other cells are empty.

In the case of the device and method of processing query according to an embodiment of the present disclosure, it is possible to search for top-k subarrays, that is, the answers, without necessarily computing all subarrays within the given array.

In addition, according to the present disclosure, it is possible to provide a progressive top-k query processing method, and therefore usability may be improved.

In addition, it is possible to prevent a memory overflow during the query processing in a large data, and there is an effect that distributed processing is possible.

The device described above can be implemented as hardware elements, software elements, and/or a combination of hardware elements and software elements. For example, the device and elements described with reference to the embodiments above can be implemented by using one or more general-purpose computer or designated computer, examples of which include a processor, a controller, an ALU (arithmetic logic unit), a digital signal processor, a microcomputer, an FPGA (field programmable gate array), a PLU (programmable logic unit), a microprocessor, and any other device capable of executing and responding to instructions. A processing device can be used to execute an operating system (OS) and one or more software applications that operate on the said operating system. Also, the processing device can access, store, manipulate, process, and generate data in response to the execution of software. Although there are instances in which the description refers to a single processing device for the sake of easier understanding, it should be obvious to the person having ordinary skill in the relevant field of art that the processing device can include a multiple number of processing elements and/or multiple types of processing elements. In certain examples, a processing device can include a multiple number of processors or a single processor and a controller. Other processing configurations are also possible, such as parallel processors and the like.

The software can include a computer program, code, instructions, or a combination of one or more of the above and can configure a processing device or instruct a processing device in an independent or collective manner. The software and/or data can be tangibly embodied permanently or temporarily as a certain type of machine, component, physical equipment, virtual equipment, computer storage medium or device, or a transmitted signal wave, to be interpreted by a processing device or to provide instructions or data to a processing device. The software can be distributed over a computer system that is connected via a network, to be stored or executed in a distributed manner. The software and data can be stored in one or more computer-readable recorded medium.

A method according to an embodiment of the invention can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, magneto-optical media such as floptical disks, etc., and hardware devices such as ROM, RAM, flash memory, etc., specially designed to store and execute program instructions. Examples of the program instructions may include not only machine language codes produced by a compiler but also high-level language codes that can be executed by a computer through the use of an interpreter, etc. The hardware mentioned above can be made to operate as one or more software modules that perform the actions of the embodiments of the invention and vice versa.

While the present invention is described above referencing a limited number of embodiments and drawings, those having ordinary skill in the relevant field of art would understand that various modifications and alterations can be derived from the descriptions set forth above. For example, similarly adequate results can be achieved even if the techniques described above are performed in an order different from that disclosed, and/or if the elements of the system, structure, device, circuit, etc., are coupled or combined in a form different from that disclosed or are replaced or substituted by other elements or equivalents. Therefore, various other implementations, various other embodiments, and equivalents of the invention disclosed in the claims are encompassed by the scope of claims set forth below.

What is claimed is:

1. A processor-implemented method of processing top-k (k is a natural number) query in an array database, the method comprising:
    executing computer readable code, stored in a non-transitory computer-readable storage medium, by a processor and configuring the processor, through the execution, to perform partition-based progressive distributed processing operations of:
    dividing the array database including cells into partitions, the dividing of the array database into the partitions comprises:
        storing information about the partitions including a maximum value of attribute values of the cells included in each partition, a cell count having the attribute values, a position of a starting cell of each partition, and an ending cell of each partition, and
        sorting the partitions in descending order of the maximum value of attribute values of the cells included in each partition;
    determining top-k subarrays as scored by at least one specific measure by identifying candidate subarrays in the array database based on a respective scoring of subarrays, from among a plurality of subarrays, that satisfy a predefined selection condition without calculating all of the plurality of subarrays in the array database; and
    determining a pattern change of array data in the array database over times and predict a practical meaning of the array data, based on a result of the determining the top-k subarrays, while preventing memory overflow during the processing of the top-k query.

2. The method of claim 1, wherein determining the top-k subarrays as scored by at least one specific measure includes:
    selecting a first partition having a largest maximum value among the partitions;
    computing a score of each of subarrays including at least one of the cells included in the first partition;

comparing a score of the subarray for which a score is computed with a score of the subarray having the highest score among pre-computed scores; and determining whether the subarray for which the score is computed overlaps at least one subarray predetermined in response to the top-k query when the score of the subarray for which the score is computed is greater than the score of the subarray having the highest score among the pre-computed scores, and when the subarray for which the score is computed is non-overlapped with the at least one subarray predetermined in response to the top-k query, replacing the subarray with the highest score with the subarray for which the score is computed and determining the subarray for which the score is computed as a candidate group of the response to the top-k query.

3. The method of claim 2, further comprising:
determining the subarray for which the score is computed as the candidate group when the score of the subarray for which the score is computed is less than the score of the subarray having the highest score.

4. The method of claim 2, further comprising:
selecting a second partition as the largest maximum value of partitions other than the first partition among the partitions; and determining a subarray having the highest score as an $i^{th}$ answer when a score of a subarray having the highest score is greater than an USB (upper bound score) of the second partition.

5. The method of claim 4, wherein the UBS is a value obtained by multiplying the maximum value of the second partition and the number of cells included in the subarray.

6. The method of claim 4, further comprising: deleting a subarray overlapping the subarray determined by the $i^{th}$ answer among subarrays included in the candidate group.

7. The method of claim 1, wherein a first partition, of the partitions, is divided into cells, each of which has a rectangular shape and a size equal to or smaller than a predetermined initial partition size, the starting cell refers to a cell located at an upper left of the partition, and the ending cell refers to a cell located at a lower right of the partition.

* * * * *